INVENTOR.
OTTO JENSEN
BY
OSTROLENK, FABER, GERB & SOFFEN
ATTORNEYS

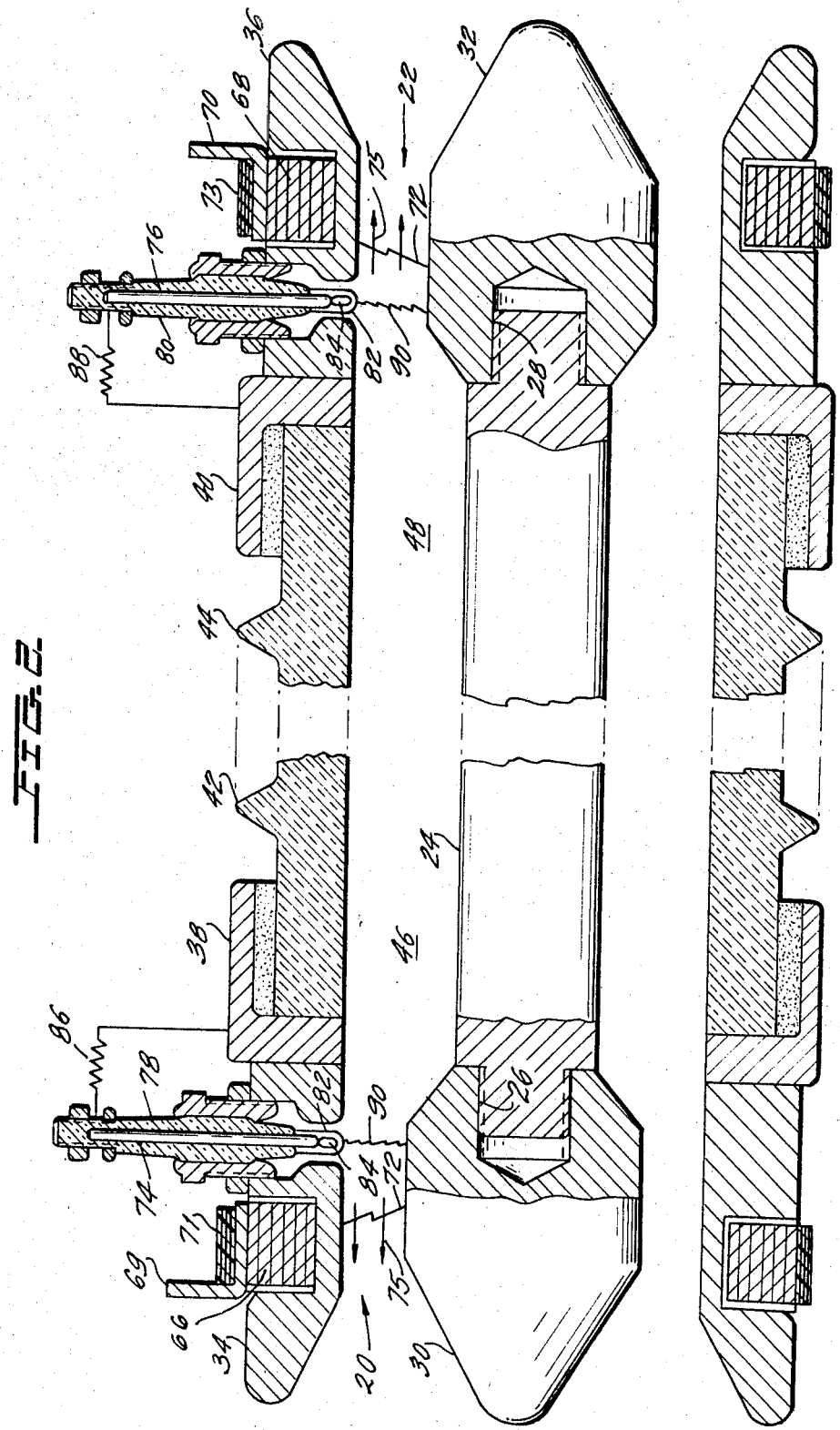

United States Patent Office 3,452,251
Patented June 24, 1969

3,452,251
PROTECTIVE ARRANGEMENT FOR SERIES CAPACITOR BANK
Otto Jensen, Malvern, Pa., assignor to I-T-E Circuit Breaker Company, Philadelphia, Pa., a corporation of Pennsylvania
Filed July 29, 1966, Ser. No. 568,942
Int. Cl. H02h 7/16
U.S. Cl. 317—12                     10 Claims

ABSTRACT OF THE DISCLOSURE

A capacitor bank protection system having series-connected spark gaps fired responsive to the firing of a precision spark gap connected in parallel with one of the series gaps. Each pair of spark gaps are disposed at the outer end of a central elongated electrode surrounded by cooperating ring-shaped electrodes at the outer ends of the central electrode. An air blast is introduced into the annular space between the central electrode and outer cooperating electrodes for extinguishing the arc.

---

This invention relates to a protective arrangement for a series capacitor bank in a high voltage alternating current power transmission line, and more particularly relates to improvements in spark gaps which are used to electrically by-pass such capacitor banks when they are subject to voltages above an acceptable level; to a control system for initiating the firing of such improved spark gaps; and to a control system for reinserting the capacitor bank into the transmission line on the first current "zero" after the spark gap current and hence the line current returns to a predetermined normal level.

Series capacitor banks are used in alternating current power transmission lines to improve system operation by neutralizing the line reactance. That is, the power transmission lines themselves are known to be inductive. The existence of such line inductance disadvantageously affects the power factor, transport capacity, stability, and voltage regulation of the line. This condition is especially severe in the long distance, extra high voltages lines (as for example 500 kv. lines) which are currently coming into more frequent use.

To balance out the inductive reactance of the line, it is known to insert capacitors in series along the line of a sufficient magnitude to compensate for all or part of the line reactance. The voltage appearing along such series capacitors will be directly proportional to load current, therefore subjecting a non-protected series capacitor unit to an excessive voltage during the occurrence of a line fault condition. Although such capacitor units are capable of withstanding moderate overloads for brief periods, they will be subjected to serious damage should the line current exceed its normal value by an extensive amount, i.e., three times the normal rating of the capacitor, even momentarily.

The volume and price of a capacitor generally increases with the square of its maximum current rating. It is therefore economically undesirable to use series capacitors rated greatly in excess of normal line current. Accordingly, it has become the practice to use a bank of capacitors rated at substantially normal loads, and to provide a rapid by-passing arrangement for the capacitor bank responsive to the presence of excessive fault conditions. For maximum protection, the by-pass circuit should operate almost instantaneously upon the occurrence of a fault in excess of a predetermined level.

As well known in the field, such instantaneous by-passing operation may be achieved by the use of spark gaps connected in parallel with the capacitor banks to be protected. When the bank voltage exceeds a predetermined value, the gaps spark over to accomplish the electrical by-pass and necessary protection of the capacitor bank.

A first aspect of the capacitor bank protective arrangement of the instant invention is in fact directed a novel spark gap device which fires when there is a predetermined potential impressed thereacross to electrically by-pass and protect a capacitor bank with which it is in electrical parallel. As will be described in greater detail, the novel spark gap device which forms a part of the instant invention is of three-electrode construction with such electrodes arranged to form two distinct open-ended spark gaps connected in electrical series and supported within a common housing. As will be further explained, the housing for such double spark gap device cooperates with the electrodes thereof in such a manner as to form an annular passageway through which gas may be directed to extinguish the arc currents when such arc currents, representative of the line current, have returned to their normal acceptable values. Furthermore, and as will be further explained, each of the spark gaps of the double-gap device are provided with novel magnetic field generating means which cooperates with the arc drawn between the electrodes of each gap to continually displace the roots thereof and thereby prevent electrode deterioration.

In a preferred embodiment of the instant invention, each of the spark gaps defined by the three-electrode device is provided with an auxiliary firing electrode. The tip of the auxiliary electrode is coated with an arc resistant metallic alloy and holds a small amount of radioactive material which improves the consistency of the critical spark-over voltage within the gap by establishing a basic ionization level which is significantly greater than any stray ionization which may occur within such gaps. The radial position of the auxiliary electrode is adjustable to determine the length of its gap from the center electrode which is common to the two main gaps located at each end thereof.

When a voltage above the predetermined value is applied, the auxiliary gap sparks over with the ionization produced by this preliminary arc lowering the dielectric strength of the adjacent main gap which in turn sparks over. Finally, the preliminary arc is transferred to the main electrodes, which offers a path of reduced resistance, and spins around as a result of the tangential force developed by the cooperation of the arc itself with the magnetic field generated by the field generating means mentioned previously.

As a second aspect of the instant invention, two of the above described double-ended spark gap devices are serially connected in electrical parallel across two capacitor banks, each of which represents one-half of the total capacitor installation which is to be protected. A precision triggering device is placed in parallel with one of the gaps of one of the double-ended spark gap devices. A voltage balancing resistor network comprising a plurality of identical resistors of high ohmic value is connected in parallel with the gaps such that one of the resistors is connected in electrical parallel with one of the four gaps defined by the two double-ended three-electrode protective devices and with one of such resistors being in parallel with the precision triggering device.

Under normal conditions the voltage across each resistor and the gap it shunts, is a portion of the total capacitor bank voltage determined by the proportion of the individual resistance to the total and is insufficient to flash the gap. When the bank voltage becomes abnormally high in response to fault conditions on the line in which it is inserted, then all gap voltages increase in the same proportion. At a critical predetermined value of voltage, the precision triggering means flashes over and in so doing shorts out the gap with which it was in electrical parallel. With that gap shorted, the total potential that was previously distributed in series across the two gaps of the first double-ended spark device now appears across the second gap and causes it to flash over such that the total capacitor bank voltage is now impressed on the two gaps of the second double-ended spark device causing their flash-over such that a current path is established through all four gaps in series which by-passes and thereby protects the capacitor bank. As will be further explained in greater detail, the use of a plurality of spark gaps, each shunted by one of the resistors of the voltage dividing network, permits the firing of the precision triggering means which begins the by-passing operation at a voltage substantially lower than is possible in the prior art, while at the same time subjects the capacitor banks which form half of a capacitor installation to lower fault voltages.

Returning once again to the overall protective arrangement, it should be noted that, regardless of its type, once a spark gap fires it will continue to conduct, regardless of the magnitude of its current, until it is either by-passed by a metallic connection or the arc is extinguished by external means such as a gas blast. During the period in which the series capacitor bank is by-passed from the series line it is effectively removed from aiding to neutralize the inductive reactance of the line. Since the system stability provided by the capacitor bank is particularly important immediately following the clearing up of the fault condition, it is essential that the protective system operate to restore the capacitor to the line as rapidly as possible after the danger of capacitor damage has been dissipated by the clearing up of the fault. Therefore, means must be provided to stop the by-passing action of the spark gap and thereby reinsert the capacitor bank, once the line current returns to an acceptable value.

In prior art, spark extinction and capacitor reinsertion has been generally accomplished by one of two systems. The first system previously used for gap arc extinction consists in providing a switch in parallel with the bank and the spark gap, and means for closing that switch automatically once the gap has fired. The gap current is thus transferred to the switch, and the gap arc becomes extinguished, while the bank remains by-passed by the switch. Means are provided to monitor the line current so as to re-open the switch and thereby reinsert the capacitor bank if the abnormal current subsides within a prescribed interval, or to lock it closed if the abnormal condition persists beyond that interval.

In the second prior art system, a gas blast on the gap extinguishes the arc at every current "zero." If the current in the subsequent half-cycle is still abnormally high, the gap is fired by the same means that triggered it on the previous cycle. This process is repeated every half cycle, as long as the current remains at a high value. Finally, when the current returns to normal, the gap is not triggered any more and the capacitor bank is thereby reinserted into series with the transmission line.

Both of the above systems have inherent disadvantages. In the first mentioned system, the reinsertion of the capacitor bank upon return of normal current which is effected by the opening of the switch, is delayed because of the inertia of the switch. This keeps the capacitor by-passed longer than is strictly necessary for its protection and thus prevents the capacitor from performing its function of neutralizing the inductive reactance of the line immediately following the clearing up of the fault condition. In the second system, the abnormal current must start to flow again in the capacitors after each current "zero" until the corresponding over-voltage is sufficient to trigger the gap once more. This subjects the capacitor to over-voltages every half cycle and therefore defeats to some extent the very purpose of the protective gap.

In contradistinction to the prior art, and in accordance with a third aspect of the capacitor bank protective arrangement of the instant invention, there is provided a control system wherein once a spark gap has been triggered, it remains in the conducting condition until the current returns to its normal value, at which time the arc in the gap is extinguished on the first current "zero," thus eliminating the necessity of providing a metallic by-pass switch while at the same time eliminating the necessity of subjecting the bank every half cycle to the over-voltage required to trigger the gap. As will be further described, the control system further provides that the reinsertion of the capacitor bank caused by the extinguishment of the arc gap on the first current "zero" after such gap current returns to a predetermined acceptable value will only occur if such return to normal value occurs at a prescribed time period. If the gap current, and hence the line current, fails to return to an acceptable value within a prescribed time period, the control system further provides a permanent by-pass of the bank by means of a metallic connection.

From the foregoing it is to be appreciated that the above described contributions of the instant invention: that is, the improvements in the spark gap themselves; the control circuitry which initiates the firing thereof to protect the capacitor installation; and the control systems for causing extinguishment of the arc currents at the first current "zero" following the return to normal line current, if the return to normal occurs within a predetermined time interval, are somewhat independent in nature in that any one or a combination of such features may be utilized in a capacitor protective arrangement without the necessity of including all such features. However, it is to be understood that when all three features are integrated into one capacitor protective arrangement, the superior operating characteristics of each separate subsystem cooperate to provide a protective system which is far superior to any system presently available in the prior art.

Accordingly, it is an object of the instant invention to provide a capacitor protective arrangement for alternating current transmission lines which permits the electrical by-pass of a series-connected capacitor installation in response to predetermined conditions appearing on such transmission lines.

Still another object of the instant invention is to provide such a capacitor protective arrangement which includes novel double-ended spark gap devices of three-electrode construction, so constructed that a central electrode is common to two main spark gaps located at opposite ends thereof.

Still another object of the instant invention is to provide such a spark gap device which includes a central electrode and open-ended spark gaps located at opposite ends thereof with the electrodes of each of said oppositely disposed gaps being protected from deterioration by the provision of means for spinning and continually displacing arcs drawn between the electrodes thereof.

Still another object of the instant invention is to provide such a spark gap device which includes oppositely located main spark gaps, with each of such spark gaps including an auxiliary electrode which improves the consistency of the spark-over voltage thereof by establishing a basic ionization level within each of such gaps which is significantly greater than stray ionization which may occur within such gaps.

Yet another object of the instant invention is to provide such a spark gap device including a pair of oppositely disposed open-ended spark gaps wherein the electrodes of such spark gaps cooperate with an insulative housing to define an internal annular passageway which facilitates the extinguishment of arcs established therein.

Still another object of the instant invention is to provide such novel spark gap construction which includes first and second electrodes spaced apart by a predetermined gap to prevent the flow of an electric arc therebetween until a predetermined potential difference is impressed thereon and coil means positioned with respect to an electrode for generating a magnetic field in response to flow of an electric arc which coacts with said arc to continually displace its root and thereby protect the electrodes from deterioration.

Still another object of the instant invention is to provide a protective arrangement for a capacitor installation which includes a spark gap which prevents the flow of an electric arc drawn between the electrodes thereof until a predetermined potential difference is impressed therebetween, a supply of compressed gas, and a control system responsive to the flow of such an electric arc to cause said compressed gas to flow from said supply to the spark gap to extinguish said arc when its magnitude falls below a predetermined level.

Still another object of the instant invention is to provide such a system which includes means for permanently by-passing the capacitor installation and spark gap if the magnitude of said electric arc does not fall below said predetermined level within a predetermined time interval.

Still another object of the instant invention is to provide a control system for initiating electrical by-pass of a capacitor installation which includes a voltage dividing network connected in electrical parallel with a pair of double-ended spark gap devices and with capacitor banks representing one-half of a capacitor installation which is to be protected, wherein the firing of a precision triggering means which is in parallel with one gap of one of the double-ended spark devices causes a sequential firing of the four gaps defined by the two double-ended spark gap devices to provide a series by-pass around the capacitor installation for the protection thereof.

Still another object of the instant invention is to provide a capacitor protective arrangement which includes novel double-ended spark gap devices; a novel system for initiating the firing thereof to establish the electrical by-pass for the capacitor installation; and a novel system for causing the extinguishment of arcs established across such spark devices, and the reinsertion of the capacitor installation when the magnitude of the electric arcs falls below an acceptable value.

Still another object of the instant invention is to provide such a system which further includes a novel arrangement of compressed gas, conduit means, and internal passageways which facilitates the extinguishment of electric arcs drawn within the double-ended spark gap devices of the instant invention.

Still another object of the instant invention is to provide a capacitor protective arrangement which includes a double-ended spark gap device which is fired to provide an electrical by-pass of the capacitor installation in response to predetermined conditions and which further includes a supply of compressed gas to extinguish such arc in response to its magnitude falling below an acceptable level, with such double-ended spark device being supported above the supply of compressed gas by an insulating column which includes an internal passageway communicating between the spark gap device and the supply of compressed gas.

Other objects and a fuller understanding of the instant invention may be had by referring to the following description and drawings, in which:

FIGURE 2 is an enlarged view of the main gaps of the double-ended spark gap device of FIGURE 1;

Figure 4:
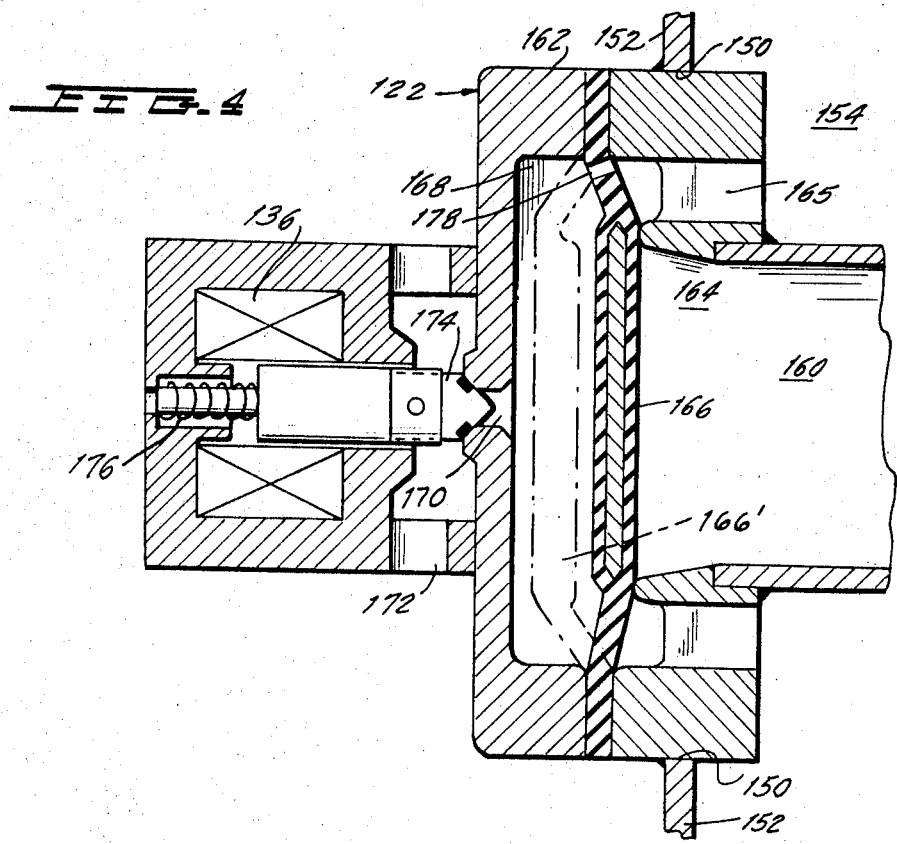
Figure 3:
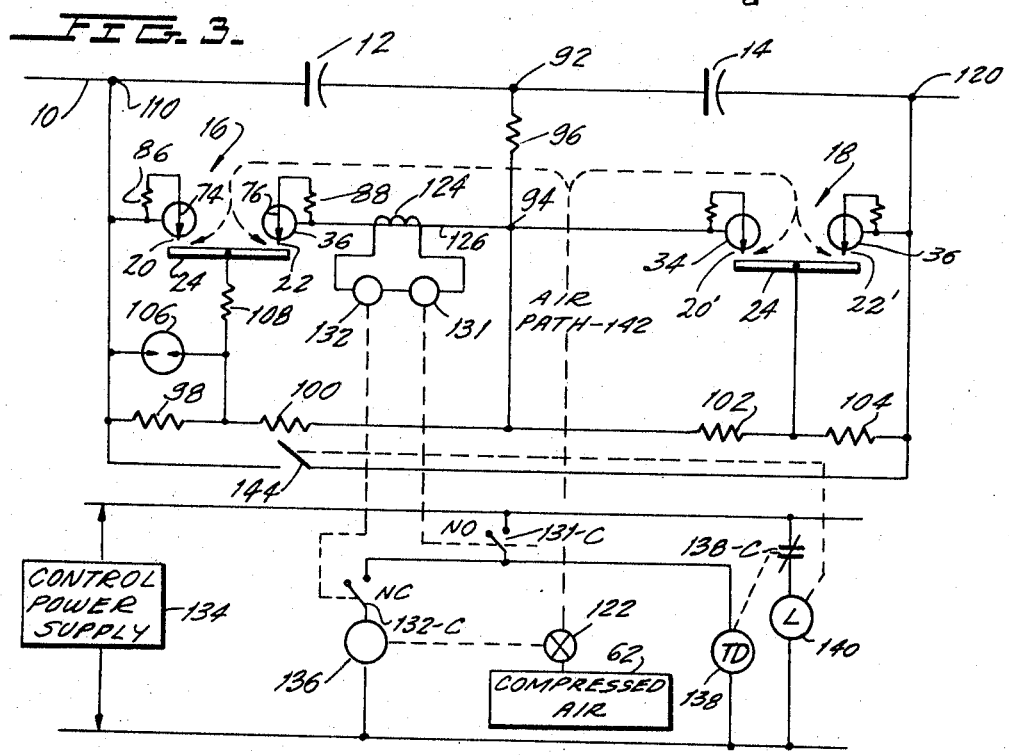

FIGURE 3 is a schematic circuit diagram which shows a plurality of the double-ended spark gap devices of FIGURE 1 arranged to protect a pair of capacitor banks as well as the control system for initiating the operation of such double-ended spark gap devices to provide for the electrical by-pass of the capacitor banks, as well as the control system for reinserting such capacitor banks in the transmission line in response to the subsiding of fault conditions below acceptable values; and FIGURE 4 is an enlarged view, partially in section, of a novel blast valve which cooperates with the tank shown in FIGURE 1 to provide extinguishing means for the arcs drawn in the spark gap device mounted thereon.

Turning to the figures, there is shown in FIGURE 3 a high voltage alternating current transmission line 10 which includes, as will be described in greater detail, capacitor banks 12 and 14. As noted previously, it is customary in the art to provide such capacitor banks in series with high voltage alternating current transmission lines to neutralize the inductive effect inherent in the lines themselves. For the sake of simplicity, only one transmission line 10 has been shown in the drawings, it being understood that transmission line 10 might comprise one phase of a three-phase system or a system which includes either more or less than three phases.

As was previously disclosed, current flow in transmission line 10 and through capacitors 12 and 14 produces a proportional voltage drop across such capacitors, which during normal conditions is well within the rated voltage for the capacitors. If the line current becomes abnormally high, the voltage across the capacitor banks may reach destructive values. To protect the bank against such a contingency, means must be provided to shunt the bank very quickly in response to abnormal bank voltage. A first aspect of the instant invention is related to improvements in spark gap devices, generally indicated at 16 and 18 (FIGURE 3) which when fired, in a manner to be subsequently described, will provide the necessary electrical by-pass and protection of capacitor banks 12 and 14.

Figure 1:
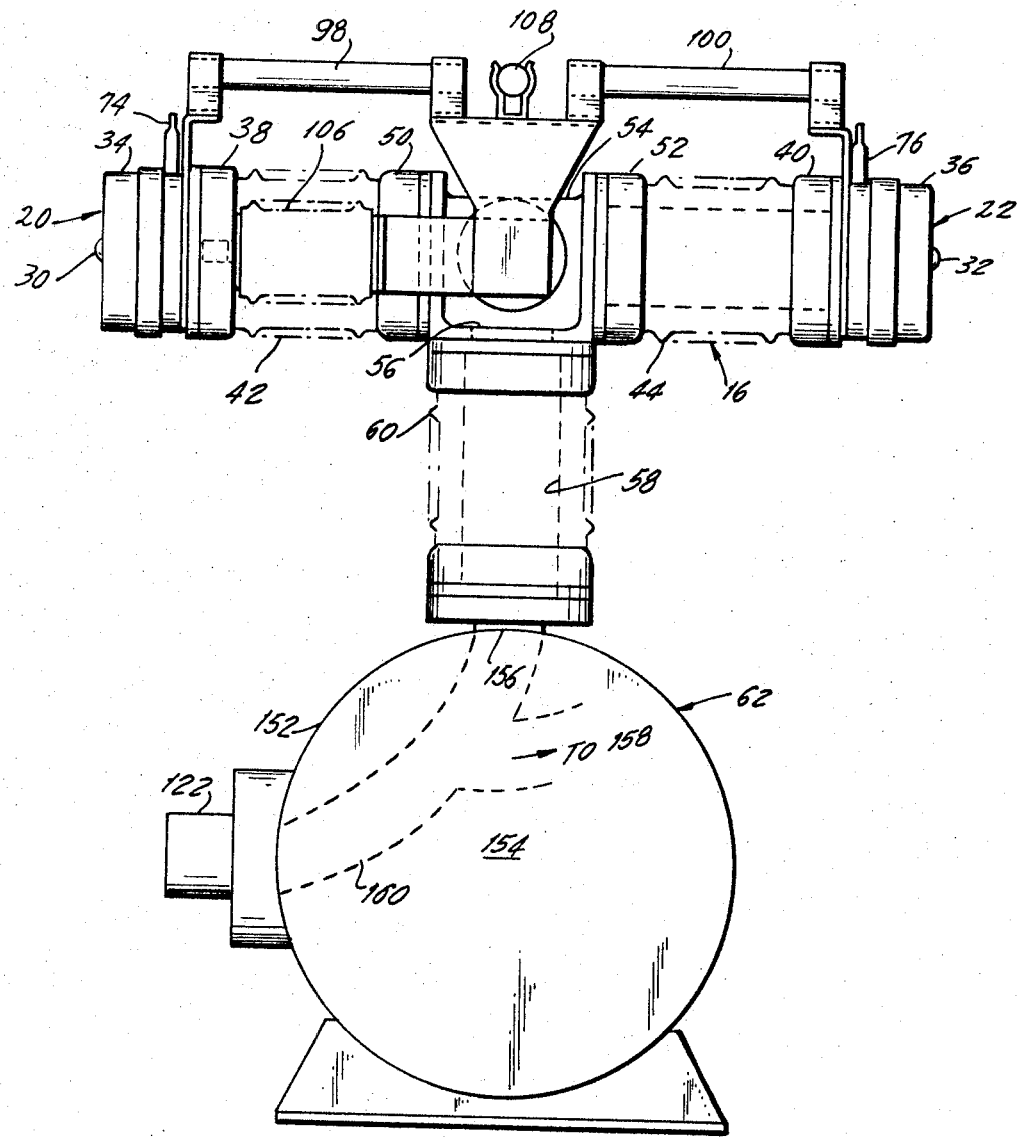
FIGURE 1 shows the double-ended spark gap device, which represents one aspect of the instant invention, mounted upon a tank which supplies compressed gas therefor.

Turning to FIGURES 1 and 2, there is shown in detail the spark gap device 16, it being understood that spark gap device 18 is of similar construction. As shown most clearly in FIGURE 2, spark gap dveice 16 is of three-electrode construction to define oppositely disposed open-ended main spark gaps 20 and 22. Specifically, a first central electrode 24 extends for substantially the entire length of the device 16. The center electrode 24 is a round, horizontal rod provided with threaded terminations 26 and 28 on which may be secured cylindrical arcing tips 30 and 32 with the diameters as required by the desired gap settings. Second and third outer electrodes 34 and 36 are of cylindrical shape and are located in a coaxial position over the end of the center electrode 24. The outer electrodes 34 and 36 are secured to flanges 38 and 40 which form the outer terminations of porcelain supports 42 and 44. The inner diameters of supports 42 and 44 are sufficiently greater than the outer diameter of center electrode 24 to define annular passageways 46 and 48 which, for the ease of explanation, may be thought of as a single elongated annular passageway extending for the entire length of the device 16 and open at both ends thereof.

Actually, as shown in FIGURE 1, supports 42 and 44 terminate in inner end flanges 50 and 52 which are secured to an inner housing 54 which similarly surrounds the center electrode 24. The inner housing 54 includes an opening 56 which communicates with an internal passageway 58 provided in a vertical insulator 60 which supports the device 16 above a tank 62 of compressed gas. As will be further explained in greater detail, in response to predetermined conditions, compressed gas is released from the tank 62, flows through internal passageway 58 of insulator 60, into the housing 54 and is oppositely directed along the annular passageways 46 and 48 within insulative supports 42 and 44 to extinguish arcs drawn within the gaps 20 and 22.

Each outside electrode 34 and 36 is provided with a coil 66 and 68, respectively, wound thereabout with an internal end electrically bound to the electrode and with its external end constituting a terminal 69 and 70, respectively, for connection to the circuit. Terminals 69 and 70 are held in place by epoxy glass filament bands 71 and 73 which extend around their respective electrodes.

Current into terminals 69 and 70 flows through the coils 66 and 68 to create magnetic fields in the gaps 20 and 22. The direction of such magnetic field in parallel to the center electrode 24 and represented by the arrows 75. When a main arc 72 has been drawn between electrodes 34 and tip 30 or electrode 36 and tip 32, such arcs coact with the magnetic field 75 to develop a force which in accordance with the left-hand rule is in a direction transverse to the direction of current flow 72 and magnetic field 75. Such tangential force continually spins the arc 72 in a circular motion about the center electrode 24 which thereby prevents the erosion of electrode surfaces 34 and 32 or 36 and 30 which would be produced at the roots of the arcs 72 if they were permitted to remain stationary.

For each of the main gaps 20 and 22 there is further provided an auxiliary firing electrode 74 and 76, respectively, held in an insulating bushing 78 and 80, respectively, through the wall of the outside electrodes 34 and 36. One end of each of these auxiliary electrodes is constituted by a threaded cap 82, coated with an arc resisting metallic alloy and holding a small amount of radioactive material 84. The radial position of the auxiliary electrodes which determines the length of its gap to the arcing tip 30 or 32 is adjustable. Each auxiliary electrode 74 and 76 is electrically connected to the outside electrode 34 and 36, respectively, by a resistor 86 and 88.

The purpose of the auxiliary electrodes 74 and 76 is to improve the consistency of the critical spark-over voltage of each gap 20 and 22. Specifically, the radioactive material 84 in each tip 82 establishes a basic ionization level within each gap 20 and 22 which is significantly greater than any stray ionization which may occur within such gaps whereby, for all practical purposes, such stray ionization may be disregarded.

When a voltage above the critical value is applied to terminal 69 or 70, the auxiliary gap sparks-over to establish a preliminary arc, illustrated at 90 in FIGURE 2. The resulting arc current is limited by the resistor 86 or 88 in series therewith. The ionization produced by this low energy arc lowers the dielectric strength of the adjacent main gap 20 or 22 and it in turn sparks over. The arc is then transferred to the main electrode surfaces 34 and 30, 36 and 32, which offers a path of reduced resistance, and now appears as power arcs 72 which are continually spun around as described above by the cooperation of the arcs and the magnetic field generated by the coils 66 and 68.

Throughout the above discussion, the process of spark-over has been described for each of the gaps 20 and 22 without regard to the particular sequence in which such gaps are fired. The only points emphasized thus far have been the construction of the overall double-ended spark gaps; the provision of means to establish continual spinning of the arcs drawn therein to prevent electrode deterioration; the use of auxiliary electrodes to improve flash-over consistency; and the cooperation of the electrodes of such device with insulative housing means to define annular passageways which, as will be subsequently described, aid in the extinguishment of arcs drawn therein.

Actually, when a double-ended spark gap device such as 16 is applied in a capacitor by-pass protective arrangement in accordance with the instant invention, there is a novel control system which establishes the firing sequence of the gaps 20 and 22, and in fact the gaps of a second double-ended spark gap device previously referred to as 18 with respect to FIGURE 3. Such control system will now be described.

Each of the capacitor symbols 12 and 14 represents a series-parallel bank of individual capacitor units, chosen to result in the required capacitor installation rating. Each bank 12 and 14 represents one-half of the total capacitor installation, with 92 being the mid-point therebetween.

Two double-gap devices 16 and 18, described previously, are connected respectively across each bank 12 and 14, with the juncture 94 between the two devices being electrically connected to the mid-point 92 through a resistor 96. The spark gap devices 16 and 18 are schematically shown in FIGURE 3 to include the common center electrode 24, the end electrodes 34 and 36, and the auxiliary electrodes 74 and 76 electrically joined to the outer electrode 34 and 36, respectively, by resistors 86 and 88 to define the oppositely disposed main gaps 20 and 22 in the device 16 and what are identified as main gaps 20' and 22' for the device 18. Although not suggested in FIGURE 3, it is to be understood that the devices 16 and 18 would similarly include coil means such as 66 and 68 shown in FIGURE 2 for generating transverse magnetic fields within the gaps 20, 22, 20' and 22'.

Each main gap is shunted by a resistor 98, 100, 102 and 104, respectively, of high ohmic value, preferably about 1 megohm each, which together constitute a voltage dividing network to equalize the voltages impressed on each gap during normal operating conditions. The openings in the main gaps are such that they will not spark over at the voltages impressed on them during normal operating conditions. A calibrated precision gap 106, which may be of the type shown and described in United States Patent 3,229,145, issued to Otto Jensen on Jan. 11, 1966 and assigned to the assignee of the instant invention, is connected in parallel across main gap 20, through a resistor 108 as shown. This precision gap 106 acts as a trigger for the protective gap system, in a manner to be described.

The voltage drop on the capacitor installation is proportional to the current in the line 10. When the current increases so do the voltages on the banks 12 and 14 as well as the voltages on the resistor network comprising 98–104. The precision triggering means 106 is set to spark-over when the voltage across it exceeds a predetermined critical value. When the precision triggering means sparks over, current flows in the path constituted by the precision gap 106, and the resistors 100, 102 and 104. The voltage on the resistor 98, applied to the gap 20, is limited to the arc drop on the precision gap, i.e., virtually zero, and the voltage of resistor 100 applied to the gap 22, jumps to a value essentially equal to the voltage on the corresponding bank 12 itself, which is in excess of the critical spark-over setting for gap 22. Gap 22 now sparks over as described earlier, with current flowing via resistor 96 and 108 and the precision gap 106.

The voltage drop caused by this current flowing in resistor 108 is now impressed on gap 20, and causes it to spark over. Current now flows in gaps 20 and 22 in series with resistor 96.

The voltage applied to gaps 20' and 22' now jumps up by the value of the voltage drop on resistor 96, causing gaps 20' and 22' to spark over. A current path through all the gaps 20, 22, 20' and 22' in series is thereby established thus causing the electrical by-pass and necessary protection of the capacitor banks 12 and 14.

The voltage dividing network comprising resistors 98, 100, 102 and 104 is continuously energized while the capacitor bank is in service. Therefore the resistance should be high, in order to minimize the thermal loss, but low enough to permit a stable arc on the precision gap when it sparks over. A value of 1 megohm or less per resistor has been found adequate in a practical installation. Resistors 108 and 96 carry currents for short times only, when the gaps operate. Resistor 96 may have a much smaller resistance but it must be built to withstand a half bank voltage without flashing over at its terminals. Resistor 108 is preferably ten times the resistance of resistor 96.

To illustrate the sequence of operation, a numerical example of the above described by-passing action will now be presented. Let it be assumed that it is desirable to by-pass the capacitor installation comprising banks 12 and 14 when the voltage appearing across such banks, i.e., existing between points 110 and 120, approaches 120 kv. For this example let it be assumed that the precision triggering means 106 will spark over when a voltage of 30 kv. is impressed thereacross while the main gaps, such as 20, 22, 20′ and 22′, will each flash-over when a voltage of 43 kv. or greater is impressed thereon.

Dealing first with normal operating conditions, let it first be assumed that a total voltage of 80 kv. appears from points 110 and 120 in FIGURE 3. Since banks 12 and 14 represent one-half of the total capacitor installation, then a potential of 40 kv. will appear between points 110 and 92 and between points 92 and 120. Because of the voltage dividing network comprising equal resistors 98, 100, 102 and 104, resistor 98 will have a potential of only 20 kv. (one-fourth of the total 80 kv. or one-half of the 40 kv. appearing across capacitor bank 12) impressed thereon and will be insufficient to either initiate the firing of precision triggering means 106 or of the higher rated gap 20. Therefore the capacitor installation will remain in series with the transmission line 10.

Assuming now a fault in transmission line 10 which causes a voltage drop between points 110 and 120 of 120 kv., resistor 98, 100, 102 and 104 will each have a potential of 30 kv. impressed thereacross. As noted above, a potential of 30 kv. on triggering device 106 is sufficient to cause firing thereof, such that current now flows from transmission line 10 through triggering device 106, resistor 100 and resistors 102 and 104. As resistor 96 is of low ohmic value, the center bank voltage at 92 is applied through 96 to the center point of resistors 100 and 102 such that 60 kv. appears across resistors 102 and 104, i.e., 30 kv. on each, while the half of the total capacitor installation voltage which was previously equally distributed across gaps 20 and 22 now appears in toto across gap 22. Since the voltage of 60 kv. now appearing across gap 22 is far in excess of the 43 kv. necessary to cause firing, gap 22 fires. The voltage across gap 22 is now "zero," but as the center bank voltage at point 92 is maintained at the junction point 94, the voltage across gap 20 increases to 60 kv. and this gap in turn flashes over.

With both gaps 20 and 22 conducting, the full capacitor installation voltage of 120 kv. is now distributed equally between resistor 96 and the capacitor bank 14. Resistors 102 and 104 each cause a voltage of 60 volts to be impressed upon gaps 20′ and 22′ which thereby in turn flash over. Thus a complete series circuit is established through gaps 20, 22, 20′ and 22′ thereby electrically by-passing the capacitor installation comprising banks 12 and 14 to provide the necessary protection thereof.

From the foregoing it will be appreciated that the combination of two double-ended spark gap devices, such as 16 and 18, in combination with the voltage dividing network 98–104 and the precision triggering means 106 provides a system whereby (1) the triggering device 106 is subjected to only one-quarter of the predetermined bank voltage which will initiate the by-passing operation, and (2) by dividing a total capacitor installation into two equal banks, and providing a voltage dividing network associated with each, each capacitor bank such as 12 and 14 in FIGURE 3 is subjected to only one-half of the predetermined fault voltage which will initiate the by-pass operation. The same comments are equally applicable with respect to the gaps 20 through 22″.

By the above described system, the capacitor installation is by-passed by the two double-ended gap devices as soon as the capacitor installation voltage climbs above a predetermined value, which in the numerical example given above was 120 kv. As was noted previously, once a spark gap begins to conduct, it remains in its conducting state regardless of its current magnitude, until the arc current is extinguished. In the prior art the extinguishment of arc current is accomplished either by a permanent metallic by-pass switch which is closed by stored energy spring mechanism or in the alternative arcs are extinguished by means of blasts of compressed gas at each current "zero." As discussed previously, both of these systems have inherent disadvantages.

In contradistinction thereto, a third feature of the instant invention is directed to a control system which provides for the extinguishment of the arcs drawn in gaps 20, 22, 20′ and 22′ and the reinsertion of the capacitor installation into the transmission line 10 within the first half cycle of normal line current without the necessity of either a metallic by-pass switch or subjecting the capacitor bank every half cycle to the over-voltage required to trip the spark gaps. As will be further explained, if the abnormal current which initiated by-passing action persists beyond a prescribed time interval, a command is initiated to permanently by-pass the capacitor installation. This automatic action takes the capacitors out of service, and subsequent reinsertion is prevented until the action is countermanded by proper personnel.

The control system for performing the above described functions is shown mainly in FIGURE 3 with the details of a blast valve 122 thereof being shown in FIGURE 4. The control circuitry includes a current transformer 124, the primary of which comprises the conductor 126 joining spark gap devices 16 and 18, and the secondary of which is connected in series with two instantaneous current relays 131 and 132.

For reasons to appear below, relay 131 is calibrated to pick up and close its associated normally open contacts 131-c at small values of current, and remains picked up as long as any current is flowing in its coil. Relay 132 is calibrated to pick up and open its normally closed contacts 132-c in response to current flow in excess of the rated bank current, and to drop out and allow its contact pairs 132-c to close (by its own biasing means, not shown) when the current flowing through conductor 126 has lowered to a normal acceptable value. Pick up and drop out actions of both relays 131 and 132 are instantaneous, i.e., with no intentional time delay. Contact pairs 131-c and 132-c are in a circuit which includes a control power supply 134, a blast valve operating solenoid 136, a time delay relay 138 and a lockout solenoid 140, all of which cooperate in the following manner.

With no current in the gap circuit, i.e., with acceptable line current flowing through transmission line 10, both relays 131 and 132 are deenergized. Therefore, contact 131-c remains open and contact 132-c remains closed. So long as contact 131-c remains open, the circuit from control power supply 134 to the blast valve operating solenoid 136 is open, such that the solenoid is deenergized and the blast valve 122 is closed to prevent the flow of compressed gas from the tank 62 up to the gaps 20, 22, 20′ and 22′.

When the gaps 20 through 22′ fire, as described earlier, current flows in conductor 126. The magnitude of this current is initially in excess of the bank rating (otherwise the gaps would not have fired) and therefore its value is sufficient to energize relay 132 as well as the lower calibrated relay 131. Normally closed contact pair 132-c operated by the energized relay 132 open, while normally open contact pair 131-c operated by the energized relay 131 closes. Since, by design, the contact pair 132-c opens before the contact pair 131-c closes, the circuit to the solenoid 136 remains open and the blast valve 122 remains closed to prevent the flow of compressed gas from tank 62.

Simultaneously, the closing of contact pair 131-c energizes time delay relay 138. The construction of time delay relay 138 is such that if it is continuously energized for a preset time interval, it closes its normally open contact pair 138-c operated thereby to place a lock out solenoid 140 in series with the control power supply 134. If the time delay relay 138 becomes deenergized before its preset time interval has elapsed, it resets without closing the contact 138-c.

The system responds to current magnitude and duration as follows. If the current in line 10, and hence conductor 126, returns to a normal value before the preset time delay relay 138 has elapsed, relay 132 drops out to allow its normally closed contact pair 132–c to close. As noted previously, because relay 131 is calibrated to pick up during any current flow through the gap circuit, contact pair 131–c remains closed.

Contacts 131–c and 132–c now complete a circuit from control power supply 134 through the blast valve operating solenoid 136 which thereby operates to open the blast valve 122 and allow compressed gas to flow from the tank 62 to the spark gaps 20, 22, 20′ and 22′, as indicated by air path 142, to cause the extinguishment of the arcs drawn therein.

Once the arcs are extinguished by the compressed gas blasts, current flow in the gap circuit stops, relay 131 drops out and its contact 131–c returns to its normally open condition, thereby interrupting the circuit to the blast valve operating solenoid 136 and to the time delay relay 138. The blast valve 122 closes by means to be subsequently described, stopping the flow of compressed gas. At the same time, time delay relay 138 is reset without its contact pair 138–c having ever been closed, and the capacitor banks 12 and 14 are thereby reinserted and the entire system returns to its original condition.

If, on the contrary, the abnormal current in the gap circuit persists beyond the preset time interval, the contact 138–c, operated by the time delay relay 138, closes, completing a circuit to energize lock out solenoid 140. Lock out solenoid 140, in turn, closes a normally open by-pass switch 144 which establishes a permanent metallic connection around the capacitor bank. The current in the gap circuit is shunted by the low resistance path through by-pass switch 144, and the arcs in the gap become extinguished. With the gaps extinguished, relays 131 and 132 drop out simultaneously, allowing normally open contact 131–c to re-open and normally closed contact pair 132–c to re-close. Thus the circuit to the valve operating solenoid 136 remains open, and no blast valve operation takes place. The capacitor installation is thus locked out, which means that its automatic reinsertion is prevented.

Turning now to FIGURES 1 and 4, a detailed explanation of the manner in which compressed gas is caused to flow from the tank 62 to the gaps 20, 22, 20′ and 22′ will now be presented.

The tank 62 of FIGURE 1 includes a large opening 150 in its outer wall 152 thereof in which is secured the blast valve 122. The tank may be thought of as having a reservoir area 154 wherein the compressed gas, preferably compressed air, is stored; a pair of exit ports 156 and 158 in the outer wall 152; and an internal conduit 160 which communicate with the exit ports 156 and 158 at one end thereof, and as will be further explained with respect to FIGURE 4, communicates with the reservoir 154 at the other end thereof.

In FIGURE 1 it will be seen that the internal passageway 58 of the insulator 60 which supports the double-ended spark gap device 16 communicates with exit port 156. Thus the hollow insulator 60 performs a dual function in that (1) it supports the spark gap device 16 above the tank 62, and (2) it provides a means of communication between the exit port 156 of the tank 62 and the oppositely directed annular passageways 46 and 48 defined between the internal electrode 24 and the hollow insulators 42 and 44 of the spark gap device 16 (see FIGURE 2).

Although not specifically shown in FIGURE 1, it is to be understood that the second double-ended spark device 18 of FIGURE 3 would be similarly mounted upon a second hollow insulator such as 60 of FIGURE 1 such that its internal passageway would communicate with the exit port 158 as suggested by the terminology "to 158" appearing in FIGURE 1. Actually, in a preferred embodiment, the second insulator-supported spark gap device 18 would be located directly behind and spaced from the first device 16 and thus would not appear in FIGURE 1.

Turning now to FIGURE 4, it will be seen that the blast valve 122 consists of a circular casing 162 provided with a central opening 164 which communicates with the internal conduit 160 of the tank. An annular opening 165 defined between the casing wall 162 and the central opening 164 communicates with the reservoir area 154 of the tank 62 at one end thereof and at the other end communicates with the interior of the casing 162. A circular shaped diaphragm 166 is held within the casing wall 162 and normally rests against the circular edge of the central opening 164 to prevent flow of compressed gas from the reservoir 154 through the annular opening 165 to the internal conduit 160 thereby preventing the flow of compressed gas to the spark gap devices. A dome 168 above the diaphragm has a conical port 170 which communicates with the atmosphere through openings 172 but which is normally closed by a needle-valve 174 held in a closed position by biasing means such as springs 176.

The needle-valve 174 is attached to the movable core of blast valve operating solenoid 136, which when energized pulls it, the needle-valve, upwards against the return spring 176. A small weep hole 178 in the diaphragm communicates with the dome area 168 at one end thereof and with the reservoir 154 at the other end thereof by means of the annular opening 165.

The operation is as follows. When the solenoid 136 is deenergized, because of an open circuit established by the contacts 131–c and 132–c, in the manner suggested previously, compressed gas from the reservoir 154 passes into the annular opening 165 and leaks through the weep hole 178 into the dome 168 forcing the diaphragm 166 down to its seating position against the central opening 164 to block the flow of air from the reservoir 154 to internal conduit 160. The diaphragm 166 remains seated, because its lower side is subjected to pressure only in the annular space 165 surrounding the central opening 164 (it being appreciated that the conduit 160 is ultimately open to the atmosphere by means of the open-ended spark gaps). The upper surface of the diaphragm 166, however, is subjected to pressure over its entire area. Therefore, the diaphragm stays in the seated position.

When the solenoid 136 is energized, the needle-valve 174 is lifted, and the dome space is exhausted through the openings 172. Now the upper pressure on the diaphragm in the annular space 165 is greater than the downward pressure on the top of the diaphragm, which is open to the atmosphere, and the diaphragm is lifted to its dotted position 166′, permitting the compressed gas to flow through the annular passageway 165 through the central opening 164, and on through the internal conduit 160 to the protective gaps as outlined above.

When the solenoid 136 is deenergized once again, the needle-valve 174 is closed by return spring 176 and the compressed gas bleeding into the dome 168 through the weep hole 178 brings the diaphragm down, stopping the air flow into the internal conduit 160.

Thus there has been described a complete capacitor by-pass protective arrangement including novel double-ended spark gap devices, so arranged as to simplify construction, reduce costs, while at the same time include insulative housing means cooperating therewith in a novel manner to aid arc extinguishment. The system further includes a novel control system including voltage dividing network means for initiating the by-passing sequence; and furthermore includes a control system for extinguishing arc currents generated during the capacitor by-passing operation when such arc currents subside below normal values. Such extinguishment is accomplished on the first current "zero" following the return to normal of line current and is achieved without the use of a permanent metallic by-pass switch or sequential gas blasts occurring at each current "zero," which techniques have been prevalent in the prior art.

Although there has been described a preferred embodiment of this novel invention, many variations and modifications will now be apparent to those skilled in the art.

I claim:
1. A system for protecting a capacitor bank in series with an alternating current transmission line, said system comprising:
   first and second series-connected spark gaps in electrical parallel with said capacitor bank, said gaps being designed to fire when a predetermined potential difference is impressed thereupon;
   voltage dividing means cooperating with said first and second spark gaps for distributing the voltage drop appearing across the capacitor bank equally across said first and second gaps; and
   precision triggering means connected in parallel with one of said first and second spark gaps, said precision triggering means firing to cause the electrical by-pass of said one of said first and second spark gaps when a predetermined critical potential difference which is less than said predetermined potential difference is impressed thereacross;
   whereby the total voltage drop which appears across said capacitor bank will now appear across the second of said spark gaps and cause the firing thereof;
   an impedance means connected between said precision triggering means and the juncture of said first and second spark gaps whereby the firing of said second of said spark gaps will cause said total voltage drop to appear across said first of said spark gaps to cause the firing thereof whereby said capacitor bank will be electrically by-passed;
   said first and second spark gaps defined by:
   first electrode means comprising an elongated conductive member having first and second ends;
   second electrode means surrounding said first end of said elongated conductive member and spaced therefrom to form said first spark gap;
   third electrode means surrounding said second end of said elongated conductive member and spaced therefrom to form said second spark gap; and
   said impedance means connected between said elongated conductive member and said precision triggering means.

2. The system of claim 1, and further including insulative housing means positioned between said second and third electrode means and surrounding said elongated conductive member but spaced therefrom to form an annular passageway which extends along the length of said elongated conductive member.

3. The system of claim 2, wherein said insulative housing means includes an opening intermediate said second and third electrode means through which gas may enter said annular passageway and be directed toward said first and second gaps.

4. The system of claim 3, wherein the firing of said first and second spark gaps is accompanied by the establishment of first and second arc currents between said first and second and first and third electrode means, respectively, and further including a supply of compressed gas and control means for directing a blast of said compressed gas through said opening and into said annular passageway toward said first and second gaps to extinguish said first and second arc currents in response to said first and second arc currents subsiding to a predetermined magnitude.

5. The system of claim 4, wherein said control means comprises:
   arc current sensing means for monitoring the magnitude of said first and second arc currents, said arc current sensing means generating control information in response to said arc currents subsiding below said predetermined magnitude;
   valve means normally closed to prevent said compressed gas from entering said opening, said valve means being opened to permit said compressed gas to enter said opening and extinguish said arc currents in response to the generation of said control information by said arc current sensing means.

6. The system of claim 5, wherein said arc current sensing means includes current transformer means coupled to one of said first, second and third electrode means, and further including:
   first and second relays electrically connected to said current transformer and having series-connected normally open and normally closed contacts, respectively, associated therewith;
   valve operating solenoid means in electrical series with said normally closed contacts of said second relay, said valve operating solenoid means changing said valve means between its closed and open states to permit said compressed gas to enter said opening in response to current flow therethrough;
   whereby arc current above said predetermined magnitude is monitored by said current transformer to energize said first and second relays to close and open said normally open and normally closed contacts, respectively, to electrically isolate said valve operating solenoid means; and arc current below said predetermined magnitude maintains said first relay energized to maintain said normally open contact closed, but causes said second relay to be deenergized to allow said normally closed contacts to close and thereby energize said valve operating solenoid means to permit said valve means to open and allow said compressed gas to enter said opening and extinguish said arc currents.

7. The system of claim 6, and further including a time delay relay connected in electrical series with said normally open contacts of said first relay, said time delay relay having a normally open by-pass switch associated therewith and operated to a closed circuit position if current through said time delay relay does not cease within a predetermined time period; said by-pass switch connected in electrical parallel with said first, second and third electrode means to cause the electrical by-pass thereof if said by-pass switch is changed to closed circuit position, whereby the closing of said normally open contacts of said first relay in response to energization of said first relay by said current transformer in response to the flow of said arc current begins said predetermined time period, and whereby if said second relay is not deenergized in response to said arc currents subsiding below said predetermined magnitude to allow said normally closed contacts to close and thereby energize said valve operating solenoid means to operate said valve means to extinguish said arc currents and thereby deenergize said first relay within said predetermined time period, said time delay relay will cause said by-pass switch to close and thereby cause the electrical by-pass of said first, second and third electrode means and said capacitor bank.

8. A system for protecting a capacitor bank in series with an alternating current transmission line, said bank comprising:
   first and second series-connected spark gaps in electrical parallel with said capacitor bank, said gaps being designed to fire when a predetermined potential difference is impressed thereupon;
   voltage dividing means cooperating with said first and second spark gaps for distributing the voltage drop appearing across the capacitor bank equally across said first and second gaps; and
   precision triggering means connected in parallel with one of said first and second spark gaps, said precision triggering means firing to cause the electrical by-pass of said one of said first and second spark gaps when a predetermined critical potential difference which is less than said predetermined potential difference is impressed thereacross;
   whereby the total voltage drop which appears across said capacitor bank will now appear across the second of said spark gaps and cause the firing thereof;

an impedance means connected between said precision triggering means and the juncture of said first and second spark gaps whereby the firing of said second of said spark gaps will cause said total voltage drop to appear across said first of said spark gaps to cause the firing thereof whereby said capacitor bank will be electrically by-passed;

said capacitor bank being protected comprising one-half of a capacitor installation, and further including:

a second capacitor bank in series with said first capacitor bank, each of said capacitors sharing half the total potential drop appearing across said capacitor installation;

third and fourth series-connected spark gaps in electrical parallel with said second capacitor bank and in electrical series with said first and second spark gaps, said third and fourth gaps being designed to fire when a predetermined potential difference is impressed thereupon;

second voltage dividing means cooperating with said third and fourth gaps for distributing the voltage drop appearing across said second capacitor bank equally across said third and fourth gaps;

whereby the firing of said first and second gaps in response to firing of said precision triggering means will cause the total potential drop across said capacitor installation to appear across said third and fourth spark gaps which will then fire to complete an electrical by-pass of said capacitor installation.

9. The system of claim 8, wherein said first and second voltage dividing means comprises first and second, and third and fourth resistors, respectively, connected in electrical parallel with said first, second, third and fourth gaps, respectively.

10. The system of claim 4, and further including hollow insulative support means supporting said insulative housing means above said supply of compressed gas, said hollow insulative support means having an internal passageway communicating with said opening in said insulative housing means and with said compressed gas.

References Cited

UNITED STATES PATENTS

| | | | |
|---|---|---|---|
| 2,584,710 | 2/1952 | Johnson | 317—12 |
| 2,862,152 | 11/1958 | Ryden | 317—12 |

LEE T. HIX, *Primary Examiner.*

J. D. TRAMMELL, *Assistant Examiner.*

U.S. Cl. X.R.

251—68, 129; 315—36; 317—62, 69